United States Patent
Lanter et al.

(10) Patent No.: US 10,336,273 B2
(45) Date of Patent: Jul. 2, 2019

(54) SENSOR SYSTEM FOR DETECTING THE ADJUSTMENT POSITION OF A VEHICLE SEAT

(71) Applicant: PolyResearch AG, Chur (CH)

(72) Inventors: Josua Lanter, Chur (CH); Silvano Buergler, Surcuolm (CH); Beat Joerimann, Chur (CH); Carsten Kaebisch, Chur (CH)

(73) Assignee: POLYRESEARCH AG, Chur (CH)

( * ) Notice: Subject to any disclaimer, the term of this patent is extended or adjusted under 35 U.S.C. 154(b) by 116 days.

(21) Appl. No.: 15/457,242

(22) Filed: Mar. 13, 2017

(65) Prior Publication Data

US 2017/0261343 A1    Sep. 14, 2017

(30) Foreign Application Priority Data

Mar. 11, 2016   (CH) .......................... 322/16

(51) Int. Cl.

| | | |
|---|---|---|
| *B60N 2/07* | (2006.01) | |
| *B60R 21/015* | (2006.01) | |
| *B60R 21/0136* | (2006.01) | |
| *G01D 5/14* | (2006.01) | |
| *B60R 21/01* | (2006.01) | |

(52) U.S. Cl.
CPC .......... *B60R 21/01554* (2014.10); *B60N 2/07* (2013.01); *B60R 21/0136* (2013.01); *G01D 5/145* (2013.01); *G01D 5/147* (2013.01); *B60R 2021/01211* (2013.01)

(58) Field of Classification Search
CPC . B60R 21/01554; B60R 21/0136; B60N 2/07; G01D 5/147
See application file for complete search history.

(56) References Cited

U.S. PATENT DOCUMENTS

| | | | | |
|---|---|---|---|---|
| 4,909,560 | A | 3/1990 | Ginn | |
| 6,854,782 | B2 * | 2/2005 | Reichert | ................. B60N 2/06 280/735 |
| 7,185,916 | B2 * | 3/2007 | Hanlon | .................... B60N 2/06 280/735 |
| 7,439,735 | B2 * | 10/2008 | Barnabo | .................. B60N 2/06 324/207.2 |
| 7,511,479 | B2 * | 3/2009 | Schuler | .................. B60N 2/002 324/207.2 |
| 8,049,491 | B2 * | 11/2011 | Nishide | ................... B60N 2/06 324/207.22 |

(Continued)

FOREIGN PATENT DOCUMENTS

| | | |
|---|---|---|
| DE | 101 36 820 A1 | 2/2003 |
| JP | 2003-227703 A | 8/2003 |

*Primary Examiner* — Peter D Nolan
(74) *Attorney, Agent, or Firm* — Buchanan Ingersoll & Rooney PC (57) ABSTRACT

A sensor system for detecting an adjustment position of a vehicle seat, the sensor system having a Hall sensor and a first preloaded magnet, and it is free of flux concentrators and shielding sheets. The Hall sensor and the first preloaded magnet are arranged along a longitudinal extension of the upper rail that is movable lengthwise such that during adjustment of the upper rail, passage of a free longitudinal end of the stationary lower rail will be monitored and result in a change of an output signal of the Hall sensor.

14 Claims, 4 Drawing Sheets

(56) References Cited

U.S. PATENT DOCUMENTS

| | | | | |
|---|---|---|---|---|
| 8,398,044 B2 * | 3/2013 | Christoffel | ........... | B60N 2/0722 |
| | | | | 248/424 |
| 2001/0025214 A1 * | 9/2001 | Isonaga | ............. | B60R 21/01554 |
| | | | | 701/45 |
| 2004/0130176 A1 * | 7/2004 | Reichert | ................... | B60N 2/06 |
| | | | | 296/65.13 |
| 2004/0251723 A1 * | 12/2004 | Endo | ...................... | B60N 2/071 |
| | | | | 297/284.1 |
| 2005/0062467 A1 * | 3/2005 | Barnabo | .................. | B60N 2/06 |
| | | | | 324/207.2 |
| 2005/0099175 A1 * | 5/2005 | Barnabo | ................ | B60N 2/002 |
| | | | | 324/207.2 |
| 2005/0151355 A1 * | 7/2005 | Hanlon | .................... | B60N 2/06 |
| | | | | 280/735 |
| 2007/0069100 A1 * | 3/2007 | Schuler | .................. | B60N 2/002 |
| | | | | 248/430 |
| 2010/0026283 A1 * | 2/2010 | Nishide | .................... | B60N 2/06 |
| | | | | 324/207.26 |
| 2011/0017897 A1 * | 1/2011 | Christoffel | ........... | B60N 2/0722 |
| | | | | 248/429 |
| 2013/0087674 A1 * | 4/2013 | Couasnon | ........... | B60N 2/0232 |
| | | | | 248/429 |

* cited by examiner

SENSOR SYSTEM FOR DETECTING THE ADJUSTMENT POSITION OF A VEHICLE SEAT

RELATED APPLICATION

This application claims priority under 35 U.S.C. § 119 to Swiss Patent Application No. 00322/16 filed in Switzerland on Mar. 11, 2016, the entire content of which is hereby incorporated by reference in its entirety.

FIELD

The present disclosure relates to a sensor system for detecting the adjustment position of a vehicle seat.

BACKGROUND INFORMATION

To an increasing extent, motor vehicles, such as motorized passenger vehicles, are equipped with safety systems such as front, side, knee and head airbags. In the event of a collision, the passengers are to be protected by these safety systems, and the risk of injury is to be reduced. Airbags must be unfolded and inflated within a very short length of time. For this purpose, propelling charges are used, which charges fill the airbag explosively and cause them to exit from the respective lining into the interior of the vehicle. The arrangement of the airbags and the selection of their sizes represent a compromise that is to be struck among the various sizes and various weights of the vehicle passengers. In the case of front airbags, there is also often provision to inflate the airbags at various levels depending on the seat positions of the vehicle passengers. Thus, in the case of a tall passenger, whose vehicle seat is arranged correspondingly farther away from the dashboard, a front airbag is to be inflated more fully than in the case of a shorter vehicle passenger, whose vehicle seat is shifted into a position that is closer to the dashboard. This is to prevent a vehicle passenger who is seated closer to the dashboard from being injured by the impact of an airbag that is inflated at full power. The inflation energy for the airbag is correspondingly controlled by using graduated amounts of propelling charges that are ignited. For the control of the inflation energy for the airbag, it is therefore important to know the approximate distance between the vehicle seat and the dashboard. In this case, it does not result in an exact measurement of distance; it is sufficient when, for example, two states of the vehicle seat, namely forward or rearward, can be detected.

In the past, therefore, different mechanical or electromechanical systems had been used to determine the position of the vehicle seat. Mechanical or electromechanical detector systems are, however, susceptible to wear and tear and can lead to unpleasant, undesirable noises when the vehicle seat is adjusted.

In the course of increasing automation, motor vehicles are being equipped more and more with electrical and electronic components that take over the function of earlier mechanical or electromechanical sensor systems. Thus, from the state of the art, non-contact sensor systems are known, with which the relative positions of two components that can move toward one another can be detected in order to generate a corresponding control signal therefrom. In the case of the vehicle seat, the components that can move relative to one another are, for example, a guide rail mounted on the vehicle bottom and a seat rail securely connected to the vehicle seat, which seat rail can be moved in a linear manner along the guide rail. In order to be able to determine the relative positions of the two rails, a magnetic strip can be applied to, for example, the guide rail, along which a Hall sensor that is connected to the seat rail can be moved. The magnetic strip can, as described in U.S. Pat. No. 4,909,560, change its polarity multiple times along its longitudinal extension. Upon relative movement along the magnetic strip, the output signal of the Hall sensor varies as a function of the immediately detected magnetic pole. This makes possible an incremental detection of the relative position of the vehicle seat.

A position sensor based on a Hall sensor, known from DE 101 36 820, allows the detection of two seat positions, forward and/or rearward, corresponding to a small or a large distance of the vehicle seat from the dashboard. In order to achieve the largest possible Hall sensor signal that can be analyzed, both publications propose keeping the distance between the magnetic poles and the surface of the Hall sensor as small as possible. In connection with the usual manufacturing and mounting tolerances, this can, however, cause the Hall sensor or its housing to grind against the guide rail when the seat rail is moved. Aside from the undesirable noise produced and the increased shifting resistance, this grinding contact can result in damage and in a failure of the sensor system.

A sensor arrangement that is mounted on the seat rail and that monitors a query plate mounted on the guide rail is known from JP 2003-227703. This sensor arrangement includes a Hall sensor, a preloaded magnet, and a flux guide plate, which are mounted inside a housing. For example, the housing has a U-shaped configuration with a take-up gap for the query plate that is to be monitored. The Hall sensor, the preloaded magnet, and the flux guide plate can be arranged on both sides of the take-up gap. An alternative variant embodiment provides that all components of the sensor arrangement are arranged on one side of the take-up gap. The flux guide plate serves to concentrate the magnetic flux to the Hall sensor and, moreover, is to shield against disruptive influences from external magnetic fields. When the vehicle seat is moved from a "rearward" position into a "forward" position, the query plate ends up in the take-up gap of the housing of the sensor arrangement. As a result, the magnetic flux through the Hall sensor is changed and generates a signal that can be assigned to a seat position. With this sensor arrangement the housing for the sensor arrangement is relatively large and has to be arranged very exactly in terms of the query plate. Also, the query plate has to be mounted separately on the guide rail, which increases the mounting costs.

The forward free end of the guide rail that points toward the footwell is, moreover, often provided with a cover, so that the danger of damage to the guide rail is eliminated. The cover can now cause the housing for the sensor arrangement to have to be mounted projecting from the seat rail relatively far to the side, so that it does not hinder the movement of the seat rail along the guide rail. The effect of this is also that the query plate that is mounted on the guide rail has to project relatively far to the side, so that it can be accommodated when it runs over the take-up gap of the housing of the sensor arrangement. In turn, however, the query plate that projects relatively far to the side can lead to impediments, for example when an object slides laterally under the vehicle seat. In this case, the danger exists that the query plate will become bent, which can impair the seat adjustment or can make correct detection of the seat position impossible, since, for example, the change in signal is no longer large enough.

With known sensor systems, in the event of an incorrect mounting, or in the event that the sensor system drops off the rail system, the sensor systems may not have any clearly defined state; in the emergency of a collision, this can lead to an additional risk for a passenger sitting in the vehicle seat if the airbag is inflated with an energy that is too low for the occupied seat position and for the height of the passenger.

SUMMARY

A sensor system is disclosed for detecting the adjustment position of a vehicle seat, by which a relative adjustment of an at least partially ferritic upper rail, moveable lengthwise along a longitudinal extension of an at least partially ferritic stationary lower rail, at least in two adjustment positions, namely a forward adjustment position and a rearward adjustment position, will be detected, the sensor system comprising: a Hall sensor, and a first preloaded magnet, free of flux concentrators and shielding sheets, whereby the Hall sensor and the first preloaded magnet are arranged along a longitudinal extension of an upper rail that is moveable lengthwise in such a way that during an adjustment of the upper rail relative to a stationary lower rail, passage of a free longitudinal end of the lower rail will be monitored and will result in a change of an output signal of the Hall sensor corresponding to a change from a forward adjustment position to a rearward adjustment position of the vehicle seat and vice versa, the sensor system being configured in such a way that when the stationary lower rail is not present, an output signal corresponding to a rearward adjustment position will be generated at the Hall sensor.

A method for adjusting a position of a vehicle seat is also disclosed, the method comprising: identifying a forward or rearward adjustment position of a vehicle seat; and generating control signals for a control of a degree of inflation for a driver airbag and/or passenger airbag based on the detected adjustment position.

BRIEF DESCRIPTION OF THE DRAWINGS

Further advantages and features of the invention follow from the description of schematic representations of embodiments of the device according to the disclosure. In diagrammatic representations that are not to scale.

DETAILED DESCRIPTION

A sensor system is disclosed for detecting the adjustment position of a vehicle seat, which system has a compact design and allows an unhindered adjustment of the position of the vehicle seat even with the covering of the guide rail being mounted. The sensor system is to supply a signal of the maximum possible magnitude that can be analyzed so that at least two positions of the vehicle seat, namely forward and/or rearward, can be clearly distinguished. The sensor system can be simple and economical in design and is to make possible a simple mounting. Mounting errors or even a dropping of the sensor system from the monitored rail system need not pose any increased risk for a passenger who is sitting in the monitored seat.

A sensor system for detecting the adjustment position of a vehicle seat, by which a relative adjustment of an at least partially ferritic upper rail, which can be moved lengthwise along a longitudinal extension of an at least partially ferritic stationary lower rail, at least in two adjustment positions, namely a forward adjustment position and a rearward adjustment position, can be detected, is disclosed. The sensor system includes a Hall sensor and a first preloaded magnet, and it is free of flux concentrators and shielding sheets. The Hall sensor and the first preloaded magnet are arranged along the longitudinal extension of the upper rail that can be moved lengthwise in such a way that in an adjustment of the upper rail relative to the stationary lower rail, the passage of a free longitudinal end of the stationary lower rail can be monitored and results in a change of an output signal of the Hall sensor corresponding to a change from a forward adjustment position to a rearward adjustment position of the motor vehicle seat and vice versa. The sensor system is configured in such a way that in the unmounted state, an output signal corresponding to a rearward adjustment position of the vehicle seat can be generated at the Hall sensor.

A sensor system according to the present disclosure can monitor the free end of the stationary lower rail, which is also very commonly referred to as a guide rail. Upon longitudinal movement of the upper rail together with the vehicle seat, the upper rail goes into an adjustment position, in which it projects over the free longitudinal end of the stationary lower rail. Because of the monitoring of the free longitudinal end of the stationary lower rail, there is no longer a need for a query plate, which otherwise must be mounted in addition. The sensor system can be reduced to the absolute bare minimum and in a first variant embodiment includes only a Hall sensor and a first preloaded magnet. Flux concentrators or shielding sheets can be eliminated, since the ferritic upper and lower rails, such as magnetizable sheets and/or steel rails, take over these functions at least partially or in places. When the upper rail, which can be moved lengthwise relative to the stationary lower rail, is moved, the sensor system runs over the free longitudinal end of the stationary lower rail. In this case, the magnetic flux that acts on the Hall sensor via a measuring field changes, and a signal can be tapped off on the Hall sensor. By reducing the sensor system to components that are absolutely necessary, namely a Hall sensor and a first preloaded magnet, the latter can be made very compact.

The Hall sensor and the first preloaded magnet are arranged along the longitudinal extension of the upper rail that can be moved lengthwise in such a way that when an upper rail is moved relative to the stationary lower rail, the passage of a free longitudinal end of the stationary lower rail can be monitored and results in a change in an output signal of the Hall sensor corresponding to a change from a forward adjustment position to a rearward adjustment position of the vehicle seat and vice versa. The sensor system can be configured in such a way that in the mounted state and when the stationary lower rail is not present, an output signal corresponding to a forward adjustment position of the vehicle seat is generated at the Hall sensor. In the case of "forward adjustment position" information that is supplied by the Hall sensor, in the event of collision, an airbag is inflated only at reduced energy in order to avoid endangering a passenger who has moved further forward in the vehicle.

The sensor system itself, however, can be configured in such a way that in the unmounted state, a signal is present at the output of the Hall sensor, which signal corresponds to the rearward seat position. If the sensor system is mounted erroneously or is even dropped, the "rearward adjustment position" information is present at the output of the Hall sensor. As a result, it is ensured that in the event of a collision, an airbag is inflated completely and at full power, so that, for example, heavier passengers, whose vehicle seats are in a rearward adjustment position, are securely caught. Studies show that lighter passengers, who are potentially sitting in a forward seat position, thus are not overly affected. However, statistically speaking, this "default" configuration of the sensor system with respect to the "rearward adjustment position" ensures the best possible protection of the significantly larger proportion of passengers.

A variant embodiment of the sensor system can provide that the Hall sensor and the first preloaded magnet are aligned with one another in such a way that in the mounted state and when the lower rail is not present, the bulk of magnetic field lines of a magnetic field generated by the first preloaded magnet run through a measuring field of the Hall sensor. Such an arrangement of the Hall sensor and the first preloaded magnet can be implemented relatively simply in terms of design.

Another variant embodiment of the sensor system can provide that a second preloaded magnet is arranged relative to the Hall sensor and the first preloaded magnet in such a way that in the mounted state and when the lower rail is not present, the bulk of magnetic field lines of a resulting magnetic field run through a measuring field of the Hall sensor. The second preloaded magnet is used to deform the magnetic field of the first preloaded magnet in such a way that in the case of the detected lower rail or even in the case of a dropped sensor system, a desired low flux density can be achieved by the measuring field of the Hall sensor in order to reliably indicate the rearward adjustment position.

In another embodiment of the sensor system, it can be provided that in the forward adjustment position, a magnetic field that runs through a measuring field of the Hall sensor has a magnetic flux density, which is greater than in the rearward adjustment position. For example, the magnetic flux density in the forward adjustment position can be up to 20 mT, while it is only about 2-3 mT in the rearward adjustment position. As an alternative, the magnetic flux density in the forward adjustment position could be, for example, approximately up to +10 mT, while the magnetic flux density in the rearward adjustment position is, for example, about −10 mT. It is understood that the indicated magnetic flux densities are examples. The effective necessary and achievable magnetic flux densities are dependent, for example, upon material and configuration.

In another variant embodiment of the sensor system according to the disclosure, the Hall sensor and the first and optionally the second preloaded magnet can be arranged relative to the upper rail that can be moved lengthwise in such a way that they can be moved jointly and together with the upper rail. In the case of a running-over and detecting of the stationary lower rail, a magnetic field of the first preloaded magnet or a resulting magnetic field from the first and second preloaded magnets is deformed by the lower rail in such a way that the field lines of the magnetic field are essentially directed past a measuring field of the Hall sensor, and an output signal corresponding to a rearward adjustment position can be generated on the Hall sensor.

A variant embodiment of the disclosure can provide that the sensor system be designed as a structural unit by the Hall sensor and the first preloaded magnet and optionally also the second preloaded magnet being arranged in, for example, a sensor housing. As an alternative, the Hall sensor and the first preloaded magnet as well as optionally also the second preloaded magnet can be molded-in with a housing-like plastic encasing. As a structural unit, the sensor system is even easier to handle, in particular to mount. During mounting of the sensor system, separate adjustment or alignment no longer has to be done, since the Hall sensor and the preloaded magnet(s) are already adjusted to one another inside the housing. It is sufficient to position and to anchor the structural unit, for example the sensor housing, by means of the anchoring systems provided for this purpose, for example stopping projections or the like, at the preset position on the longitudinal side of the upper rail that can be moved lengthwise. It is understood, however, that the Hall sensor and the preloaded magnet(s) can also be mounted as single components on the longitudinal side of the upper rail that can be moved lengthwise.

In another variant embodiment of the disclosure, the sensor system is mounted on the upper rail that can be moved lengthwise in such a way that the Hall sensor is arranged closer to the stationary lower rail than the first preloaded magnet. Because of this measure, structural designs of the two components can be used to this end to shield the Hall sensor optimally against magnetic noise fields and at the same time to achieve as good a concentration of the magnetic field of the first preloaded magnet on the Hall sensor as possible. In addition, the first preloaded magnet can shield the Hall sensor toward the top against falling foreign matter.

Another arrangement of the sensor system according to the disclosure can provide that the first preloaded magnet is at a vertical distance of 0.5 mm to 10 mm from the Hall sensor. This distance can prove to be suitable for a high enough sensitivity of the sensor system to achieve a sufficiently large stroke (e.g., a sufficiently large magnetic field change of, for example, 15 mT up to 80 mT), when running over the free longitudinal end of the stationary lower rail.

Because of the use of the magnetic-field-conducting properties of the two rails that can move relative to one another, namely the upper rail and the lower rail, the sensor system can be very easily introduced so that the direction of the magnetization of the first preloaded magnet is not absolutely critical. Nevertheless, a variant embodiment of the sensor arrangement can provide that the first preloaded magnet has a magnetization whose vector comprises an angle of 0° to 180° with a measuring field of the Hall sensor.

The sensor system can be mounted directly at the position, provided for this purpose, on the longitudinal side of the upper rail that can be moved lengthwise. An alternative variant embodiment of the disclosure can provide that the Hall sensor and/or the preloaded magnet and/or optionally the second preloaded magnet are mounted in such a way that they are some distance from the upper rail that can be moved lengthwise.

The sensor system according to the disclosure is designed, for example, for the use for determining the adjustment position of a vehicle seat in a motor vehicle. The stationary lower rail is a guide rail that is securely anchored in the vehicle, while the upper rail that can be moved lengthwise can also be referred to as a seat rail to which the vehicle seat is anchored. The two rails together form an adjustable seat anchoring in a motor vehicle. The Hall sensor and the first preloaded magnet and optionally the second preloaded magnet can be arranged at a distance from the upper rail or seat rail that can be moved lengthwise in order to detect in the seat adjustment the running-over of the free longitudinal end of the stationary lower rail or guide rail. In principle, a forward longitudinal end of the lower rail that projects into the footwell or else a rear end of the lower rail facing away from it can be detected. The sensor system accordingly supplies a signal for "forward adjustment position" or for "rearward adjustment position." Because the forward adjustment position, which also corresponds to a forward seat position of a passenger, can be considered to be the more critical from the standpoint of safety, it proves to be suitable when the sensor system monitors the running-over of the forward free longitudinal end of the lower rail during adjustment of the upper rail relative to the lower rail, for example when the upper rail is moved from the forward adjustment position into a rearward adjustment position.

In another variant embodiment of the disclosure, the upper rail can be configured in such a way that it at least largely shields the Hall sensor of the sensor system. To this end, the upper rail has an extension that projects laterally and upward essentially along the entire longitudinal extension thereof. This lateral extension encompasses the Hall sensor on a longitudinal side and shields it, while the opposite longitudinal side is shielded by the longitudinal side of the upper rail. The mounted Hall sensor is covered from above by the first preloaded magnet arranged above it. Because of this design of the upper rail, on the one hand, an optimal shielding against magnetic noise fields can be achieved, and, on the other hand, a very good concentration of the magnetic field of the first preloaded magnet on the Hall sensor is ensured.

The sensor system according to the disclosure in its above-described variant embodiment is designed, for example, for the monitoring of the adjustment position of a vehicle seat in order in this case to generate control signals for controlling a degree of inflation for a driver airbag and/or passenger airbag. In this case, the configuration of the sensor system ensures that when the stationary lower rail is not present, an output signal corresponding to a forward adjustment position is present at the Hall sensor.

Figure 1:
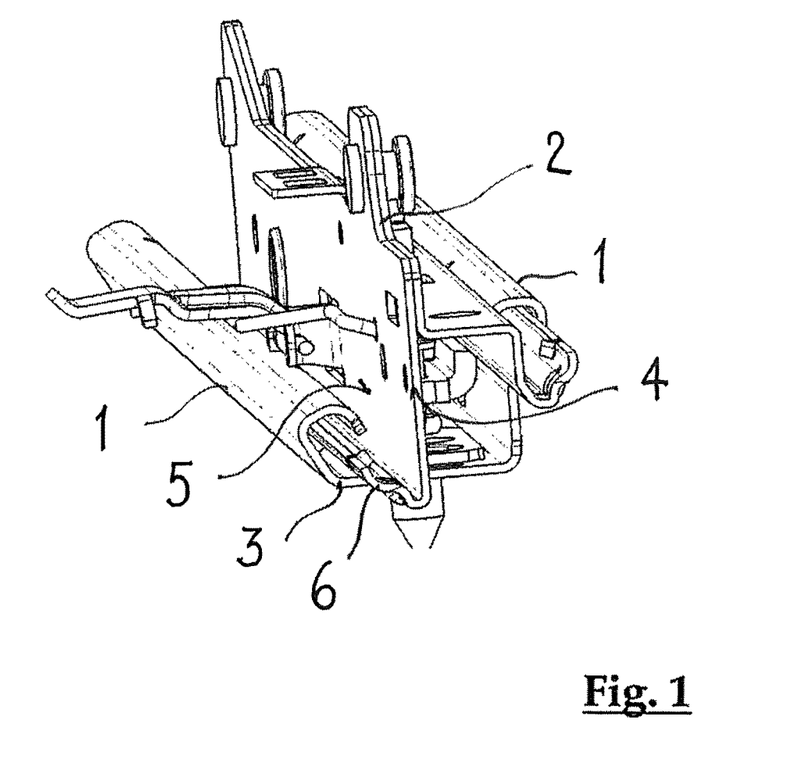
FIG. 1 shows a perspective view of a section of an exemplary seat anchoring with a stationary lower rail and an upper rail that can be adjusted thereto.

FIG. 1 diagrammatically shows a section of a seat anchoring, for example the front seat of a motor vehicle. The seat anchoring includes a stationary lower rail 1 that is anchored to the bottom of the motor vehicle and that is also very commonly referred to as a guide rail, and an upper rail 2 that can move relative thereto, along the longitudinal extension of the lower rail 1, which is also very commonly referred to as a seat rail. The upper rail 2 can be connected to the vehicle seat, not shown. It is understood that for each front vehicle seat, two stationary lower rails and two upper rails that can be moved lengthwise are provided. For the sake of greater clarity, only one of the two rail combinations 1, 2 is shown in FIG. 1, however. For example, in this case, FIG. 1 shows the arrangement of the lower rail 1 and upper rail 2, closer to a vehicle-body wall, looking toward a free longitudinal end 3 of the lower rail 1, which faces a footwell of a passenger compartment. The lower rail 1 and the upper rail 2 at least in part include (e.g., consist of) a ferritic material, such as a magnetizable steel. The free longitudinal end 3 of the lower rail 1 that faces the footwell can be covered with a plastic cover, not shown in greater detail, for the purpose of minimizing the danger of injuries on the edges of the stationary lower rail 1. The reference number 5 refers to a side wall of the upper rail that faces the lower rail 1. An extension that projects laterally and upward from the side wall 5 of the stationary lower rail 1 is provided with the reference number 6.

When adjusting the vehicle seat from a "rearward adjustment position" into a "forward adjustment position," the upper rail 2, in which the stationary lower rail 1 runs, slides in the direction of the footwell of the passenger compartment until its front end 4 projects over the free longitudinal end 3 of the stationary lower rail 1. This is the situation that is depicted in FIG. 1. Exemplary embodiments can specifically take advantage of the fact that the front end 4 of the upper rail 2 in the "forward adjustment position" projects over the free longitudinal end 3 of the stationary lower rail 1.

Figure 2:
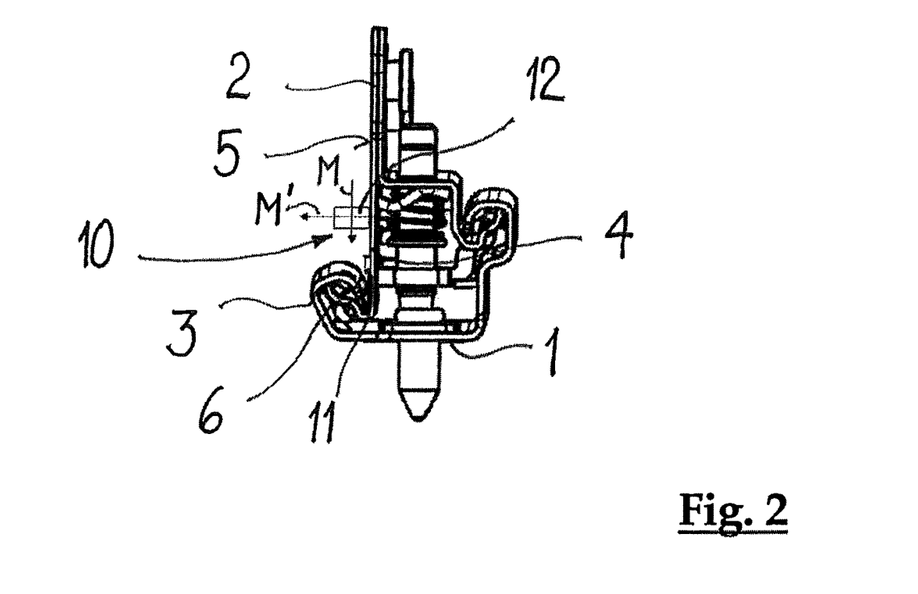
FIG. 2 shows a front view of the exemplary seat anchoring of FIG. 1 with an exemplary mounted sensor system.

FIG. 2 shows a front view of the arrangement of the stationary lower rail 1 and the upper rail 2 that is run into it. In this case, the figure shows the situation in which the front end 4 of the upper rail 2 and the free longitudinal end 3 of the lower rail 1 are arranged at approximately the same (adjustment) height. A sensor system 10 is arranged on a side wall 5 of the adjustable upper rail 2 that faces the stationary lower rail 1. The sensor system 10 includes a Hall sensor 11 and a first preloaded magnet 12, which can be designed as a permanent magnet. The first preloaded magnet 12 has, for example, a magnetic flux density of 0.3 T to 1.5 T. The sensor system 10 according to the disclosure can be reduced to the absolute bare minimum, and flux concentrators or shielding sheets are eliminated.

The arrangement of the sensor system 10 on the side wall 5 of the adjustable upper rail then depends on what distance of the vehicle seat from a dashboard of the motor vehicle is defined as a forward adjustment position or as a "forward" seat position. In any case, the arrangement of the sensor system 10 on the side wall 5 of the upper rail 2 is selected in such a way that the latter is moved lengthwise over the free longitudinal end 3 of the stationary lower rail 1 to reach the forward adjustment position. During adjustment of the vehicle seat in the forward adjustment position, the sensor system 10 thus runs over the free longitudinal end 3 of the stationary lower rail 1. The magnetic field of the preloaded magnet 12, which otherwise is very homogeneously directed onto the Hall sensor 11, undergoes a relatively strong change when reaching the free longitudinal end 3 of the lower rail 1. As a result, the magnetic flux is changed by the measuring field of the Hall sensor 11. A signal can be generated from this change, which signal can be forwarded to, for example, a system for controlling the inflation of an airbag system, so that the latter, if necessary or desired, can match the degree of inflation of an airbag to the respective "forward" or "rearward" seat position.

The Hall sensor 11 of the sensor system 10 can be arranged in such a way that it is shielded as well as possible by the upper rail 2 in the lateral direction. To this end, the upper rail 2 can have an extension 6 that projects laterally and upward essentially along the entire longitudinal extension thereof. This lateral extension 6 encompasses the Hall sensor 11 on a longitudinal side and shields it, while the opposite longitudinal side of the Hall sensor 11 is shielded by the side wall 5 of the upper rail 2. The mounted Hall sensor 11 is covered from above by the first preloaded magnet 12 that is arranged above it. In this case, the first preloaded magnet 12 can have a vertical distance of, for example, 0.5 mm to 10 mm from the Hall sensor 11. In FIG. 2, the arrows M and M' refer to two extreme directions of the magnetization of the permanent magnet 12. The vector of the magnetization M of the permanent magnet 12 can encompass, with a measuring field of the Hall sensor 11, an angle that is, for example, 0° to 180°.

Figure 3:
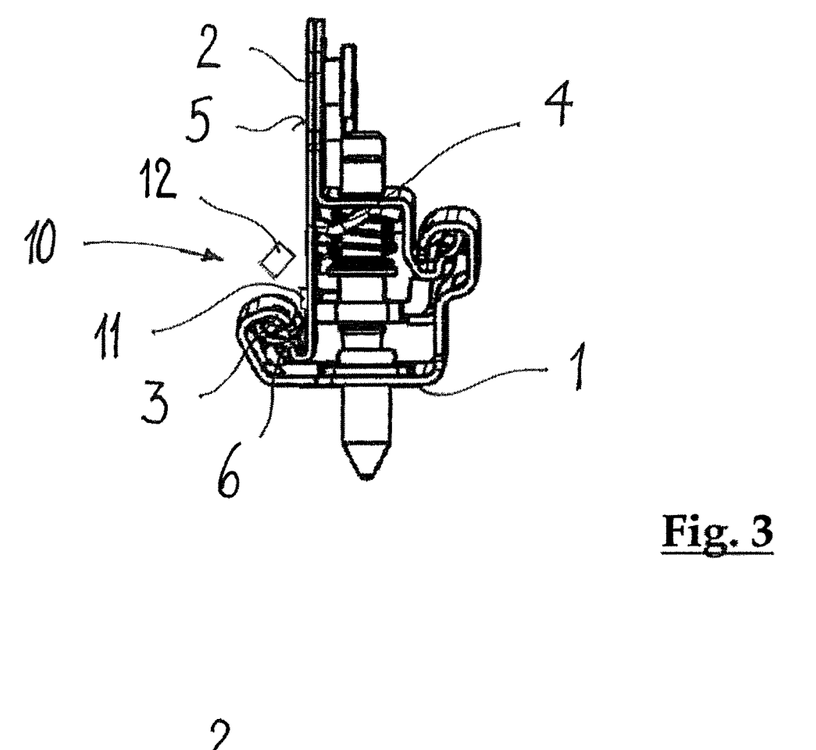
FIG. 3 shows a front view according to FIG. 2 with an alternative exemplary arrangement of the sensor system.

In a depiction analogous to FIG. 2, FIG. 3 shows a second variant embodiment of the sensor system, which in turn is provided overall with the reference number 10. The same components bear the same reference numbers as in FIG. 2. The Hall sensor 11 of the sensor system 10 is arranged on, for example, the side wall 5 of the upper rail 2 that faces the stationary lower rail 1. In this case, the Hall sensor 11 can be placed in such a way that it is encompassed by, on the one hand, the lateral extension 6, and it is shielded by, on the other hand, the side wall 5 of the upper rail 2. The first preloaded magnet 12 can be mounted, for example, at a distance from the side wall 5 of the upper rail 2 and can be rotated relative to the measuring field of the Hall sensor 11. As a result, the vector of the magnetization comprises, for example, an acute angle with the measuring field of the Hall sensor 11. By virtue of the fact that the sensor system 10 uses the adjacent side surface 5 and the extension 6, as well as the section of the stationary lower rail 1 encompassing the extension 6, as flux concentrators, the alignment of the first preloaded magnet 12 on the Hall sensor 11 plays only a subordinate role. In FIG. 3, the first preloaded magnet 12 is depicted symbolically "floating" in air. It is understood, however, that the preloaded magnet 12 can be anchored to a carrier, which can in turn be anchored to the adjustable upper rail 2.

Figure 4:
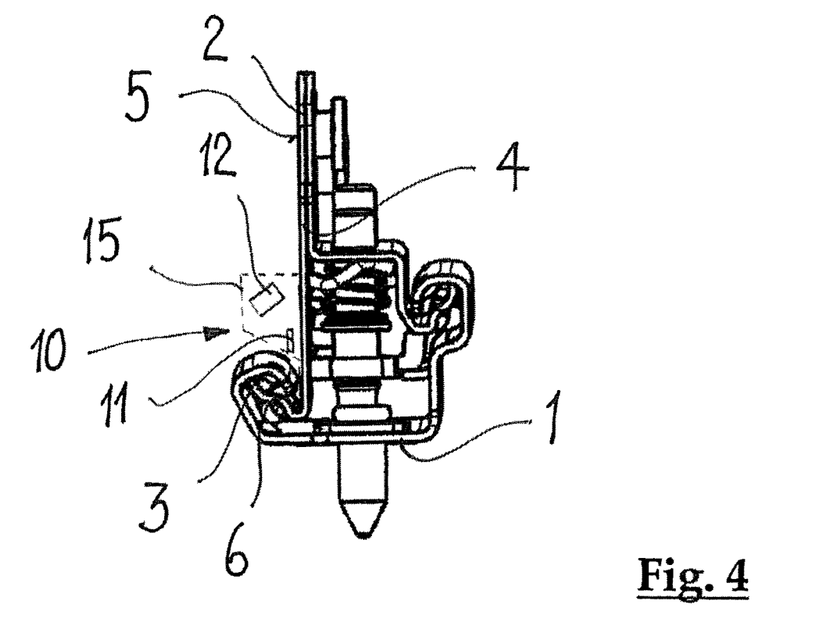
FIG. 4 shows another exemplary variant embodiment.

FIG. 4 shows another variant embodiment of a sensor system according to the disclosure, which in turn is provided overall with the reference number 10. In turn, the same reference numbers refer to the same components. In the embodiment depicted, for example, the Hall sensor 11 and the first preloaded magnet 12 of the sensor system 10 are both arranged at some distance from the side wall 5 of the upper rail 2. To this end, they can be arranged as a structural unit in a sensor housing 15, which is indicated by broken lines in FIG. 4. As an alternative, the Hall sensor 11 and the first preloaded magnet 12 can also be molded-in with a housing-like plastic encasing. As a structural unit, the sensor system 10 is even easier to handle, in particular to mount. FIG. 4 shows that the first preloaded magnet 12 can in turn be rotated relative to the Hall sensor 11. It is understood, however, that the first preloaded magnet 12 can also be arranged in a position that is analogous to the depiction in FIG. 2. The vector of the magnetization of the first preloaded magnet 12 can comprise an angle that is 0° to 180° with the measuring field of the Hall sensor 11.

Figure 5:
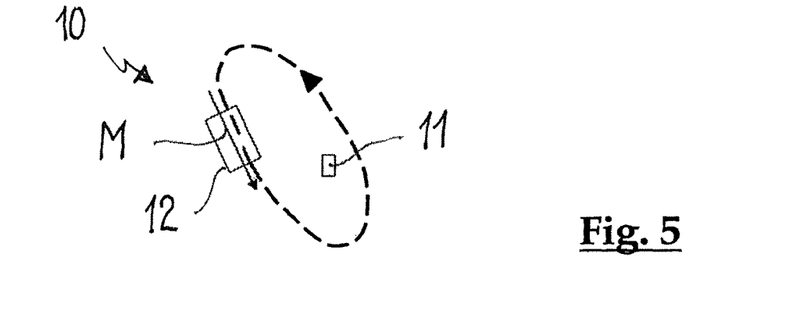
FIG. 5 shows a schematic representation of another exemplary variant embodiment of a sensor system with plots of magnetic field lines.

In turn, a sensor system that is depicted diagrammatically in FIG. 5 bears the reference number 10 overall and includes a Hall sensor 11 and a first preloaded magnet 12. The vector of the magnetization is provided with the reference number M. The Hall sensor 11 and the first preloaded magnet 12 are arranged and configured in such a way that in the unmounted state of the sensor system 10, the magnetic field lines, indicated by broken lines, of a magnetic field generated by the first preloaded magnet 12 are moved past the Hall sensor 11 or past a measuring field of the Hall sensor 11. In this situation, an output signal corresponding to a "rearward adjustment position" is present at the Hall sensor 11. In this case, the unmounted sensor system 10 corresponds to a dropped sensor system 10.

Figure 6:
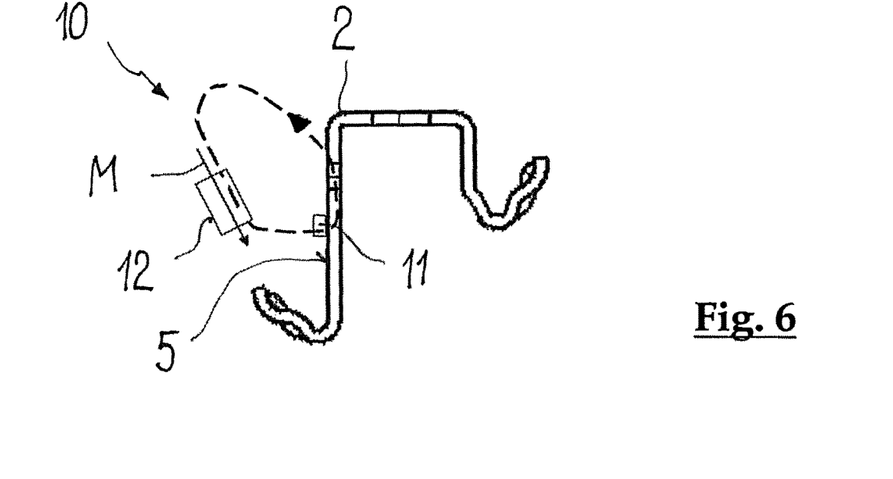
FIG. 6 shows the sensor system according to FIG. 5 anchored to an upper rail with plots of the magnetic field lines in a presence of a stationary lower rail.

FIG. 6 shows the sensor system 10 according to FIG. 5 in the mounted state. In this case, as is indicated, for example, the Hall sensor 11 can be mounted directly onto the side wall 5 of the upper rail. The first preloaded magnet 12 can be arranged at some distance from the upper rail 2 and above the Hall sensor 11. In turn, M refers to the vector of the magnetization of the first preloaded magnet 12. The magnetic field that is generated by the first preloaded magnet 12 is deformed by the upper rail 2 in such a way that the bulk of the field lines, indicated by broken lines, run through a measuring field of the Hall sensor 11. As a result, an output signal that corresponds to a "forward adjustment position" of the vehicle seat is generated on the Hall sensor 11.

Figure 7:
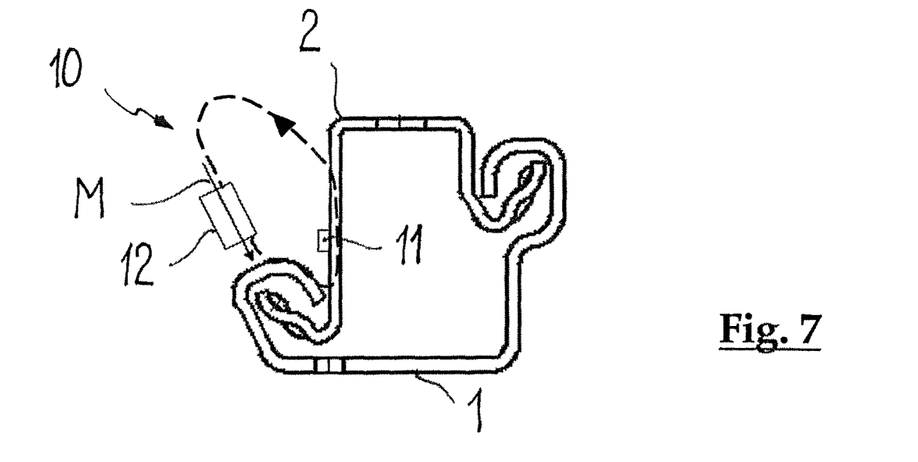
FIG. 7 shows the plot of the magnetic field lines of the exemplary sensor system according to FIG. 6 that is mounted on the upper rail in a presence of a stationary lower rail.

FIG. 7 shows the sensor system 10 according to FIG. 5 mounted on the upper rail 2 in the presence of a stationary lower rail 1. Because of the lower rail 1, the magnetic field that is generated by the preloaded magnet 12 is directed and deformed in such a way that the bulk of the magnetic field lines, indicated by broken lines, are directed past the measuring field of the Hall sensor 11. As a result, an output signal, which corresponds to a "rearward adjustment position" of the vehicle seat, is generated on the Hall sensor 11.

Figure 8:
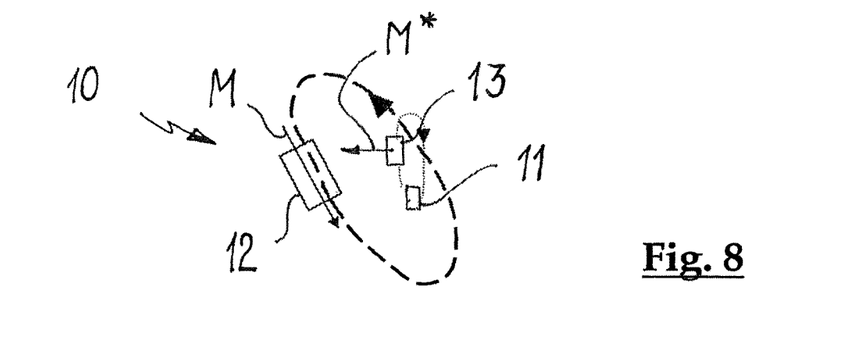
FIG. 8 shows a schematic representation of another exemplary variant embodiment of the sensor system with plots of the magnetic field lines.

FIG. 8 shows diagrammatically a modified sensor system, which in turn bears the reference number 10 overall. The sensor system includes a Hall sensor 11, a first preloaded magnet 12, and a second preloaded magnet 13. The vector of the magnetization of the first preloaded magnet bears the reference number M. The vector of the magnetization of the second preloaded magnet 13 is referred to with M*. The Hall sensor 11 and the first and second preloaded magnets 12 are in turn arranged and configured in such a way that in the unmounted state of the sensor system 10, the magnetic field lines, indicated by broken lines, of a magnetic field that results from a superpositioning of the magnetic fields of the first preloaded magnet 12 and the second preloaded magnet 13 are guided past the Hall sensor 11 or past a measuring field of the Hall sensor 11. In this situation, an output signal corresponding to a "rearward adjustment position" is present at the Hall sensor 11. In this case, the unmounted sensor system 10 corresponds to a dropped sensor system 10.

Figure 9:
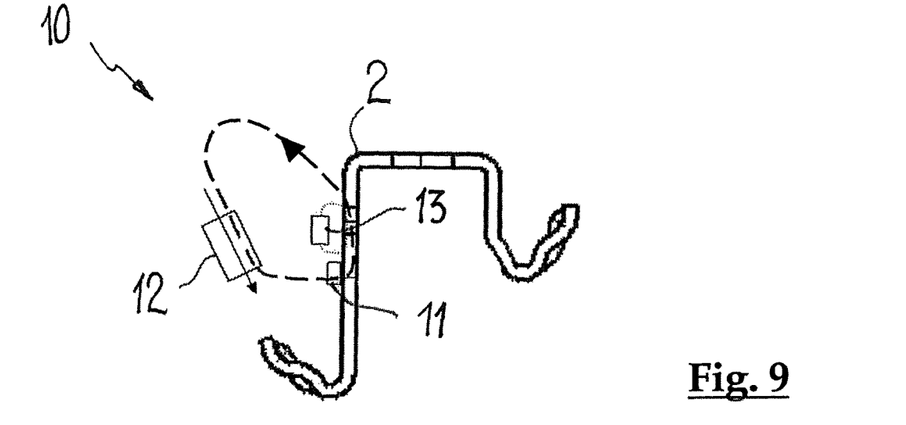
FIG. 9 shows the exemplary sensor system according to FIG. 8 that is anchored to an upper rail with plots of the magnetic field lines when a stationary lower rail is not present.

FIG. 9 shows the sensor system 10 according to FIG. 5 in the mounted state. In this case, as is indicated, for example, the Hall sensor 11 can be mounted directly onto the side wall 5 of the upper rail. The first and second preloaded magnets 12, 13 can be arranged at some distance from the upper rail 2 and above the Hall sensor 11. In turn, M refers to the vector of the magnetization of the first preloaded magnet 12. M* refers to the vector of the magnetization of the second preloaded magnet 13. The resulting magnetic field is deformed and directed by the upper rail 2 in such a way that the bulk of the field lines, indicated by broken lines, run through a measuring field of the Hall sensor 11. As a result, an output signal that corresponds to a "forward adjustment position" of the vehicle seat is generated on the Hall sensor 11.

Figure 10:
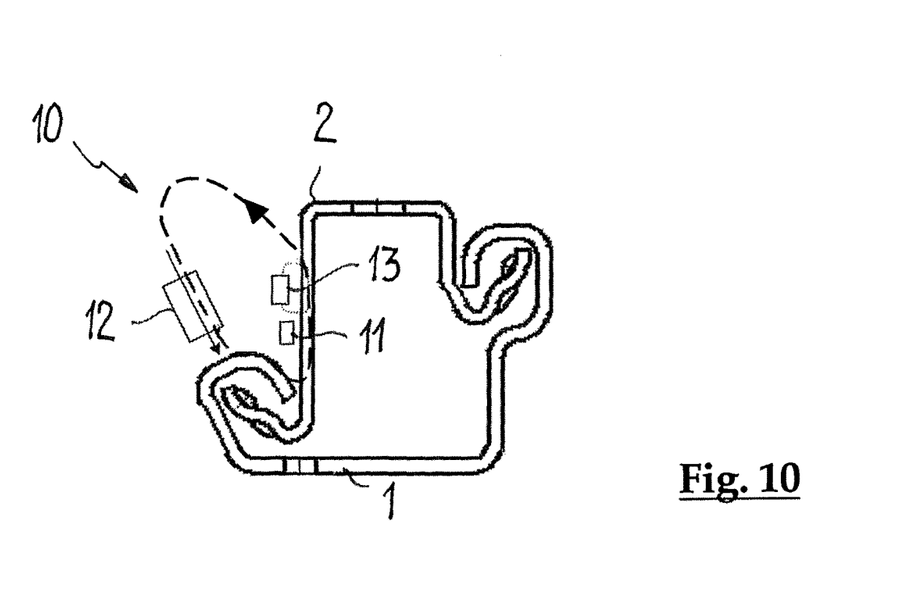
FIG. 10 shows the plots of the magnetic field lines of the exemplary sensor system according to FIG. 9 that is mounted on the upper rail in the presence of a stationary lower rail.

FIG. 10 shows the sensor system 10 according to FIG. 8 mounted on the upper rail 2 in the presence of a stationary lower rail 1. Because of the lower rail 1, the magnetic field that results from the individual fields of the first and second preloaded magnets 12, 13 is directed and deformed in such a way that the bulk of the magnetic field lines, indicated by broken lines, are directed past the measuring field of the Hall sensor 11. As a result, an output signal, which corresponds to a "rearward adjustment position" of the vehicle seat, is generated on the Hall sensor 11.

It is understood that the Hall sensor 11 of the sensor system 10 is connected via cable connections to a control unit for the control of the degree of inflation of the airbag system. For the sake of greater clarity and since it is not essential for understanding the invention, the depiction of cables and the like was, however, eliminated in the figures. Unlike the sensor arrangements of the state of the art, the sensor system 10 according to the disclosure can monitor the free longitudinal end 3 of the lower rail 1 or guide rail that is mounted securely in a motor vehicle. Upon longitudinal adjustment of the upper rail 2 or seat rail, the latter is run into a position in which it projects over the free longitudinal end 3 of the lower rail 1. Because of the monitoring of the free longitudinal end 3 of the lower rail, there is no longer a need for a query plate, which must be mounted in addition in the case of sensor arrangements known from the state of the art. The sensor system 10 is reduced to the absolute bare minimum and includes (e.g., consists of only) a Hall sensor 11 and a first and optionally a second preloaded magnet 12, 13. Flux concentrators or shielding sheets are eliminated, since the ferritic rails 1, 2, such as magnetizable sheets and/or steel rails, take over these functions at least partially or in places. Upon longitudinal movement of the upper rail 2 relative to the guide rail 1, the sensor system 10 runs over the free longitudinal end 3 of the guide rail 1. In this case, the magnetic flux that acts on the Hall sensor 11 is changed, and a signal corresponding to a forward or a rearward adjustment position can be tapped off. Because of the reduction of the sensor system 10 to the components that are absolutely necessary, namely a Hall sensor 11 and a first and optionally a second preloaded magnet 12, 13, the sensor system 10 can be made extremely compact. The configuration of the sensor system 10 or the sizing and alignment of the Hall sensor and the first and optionally the second preloaded magnet 12, 13 is selected in such a way that the sensor system 10 in the unmounted state always indicates a rearward adjustment position. The unmounted state corresponds to the dropped state of the sensor system. This ensures that, for example, an airbag system that is connected to the sensor system 10 is always inflated to the necessary extent to offer the maximum possible safety for an optionally heavier passenger who is seated in a rearward seat position.

The sensor system 10 can be designed as a structural unit by the Hall sensor 11 and the first preloaded magnet 12 and optionally also the second preloaded magnet 13 being arranged in, for example, a sensor housing. As an alternative, the Hall sensor 11 and the first preloaded magnet 12 as well as optionally also the second preloaded magnet 13 can be molded-in with a housing-like plastic encasing. As a structural unit, the sensor system 10 is even simpler to handle, in particular to mount. When the sensor system is mounted, no separate adjustment or alignment need any longer be performed, since the Hall sensor 11 and the preloaded magnet(s) 12, 13 is/are already adjusted to one another. It is sufficient to position and to anchor the structural unit, for example the sensor housing, by means of the anchoring systems, for example stopping projections or the like, provided for this purpose, to the preset position on the longitudinal side of the upper rail that can be moved lengthwise. It is understood, however, that the Hall sensor 11 and the preloaded magnet(s) 12, 13 can also be mounted as individual components on the longitudinal side 5 of the upper rail 2 that can be moved lengthwise.

The above description of actual embodiments serves only to explain exemplary embodiments of the invention and is not to be considered as limiting.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A sensor system for detecting the adjustment position of a vehicle seat, by which a relative adjustment of an at least partially ferritic upper rail, moveable lengthwise along a longitudinal extension of an at least partially ferritic stationary lower rail, at least in two adjustment positions, namely a forward adjustment position and a rearward adjustment position, will be detected, the sensor system comprising:
a Hall sensor, and a first preloaded magnet, free of flux concentrators and shielding sheets, whereby the Hall sensor and the first preloaded magnet are arranged along a longitudinal extension of the upper rail that is moveable lengthwise in such a way that during an adjustment of the upper rail relative to the stationary lower rail, passage of a free longitudinal end of the lower rail will be monitored and will result in a change of an output signal of the Hall sensor corresponding to a change from the forward adjustment position to the rearward adjustment position of the vehicle seat and vice versa, the sensor system being configured in such a way that in the unmounted state, and output signal corresponding to a reatward adjustment position of the vehicle seat will be generated at the Hall sensor.

2. The sensor system according to claim 1, wherein the Hall sensor and the first preloaded magnet are aligned with one another in such a way that in a mounted state and when the stationary lower rail is not present, a bulk of magnetic field lines of a magnetic field produced by the first preloaded magnet will run through a measuring field of the Hall sensor.

3. The sensor system according to claim 1, comprising:
a second preloaded magnet arranged relative to the Hall sensor and the first preloaded magnet in such a way that in a mounted state and when the stationary lower rail is not present, a bulk of magnetic field lines of a resulting magnetic field run through a measuring field of the Hall sensor.

4. The sensor system according to claim 1, wherein in the forward adjustment position, a magnetic field that runs through a measuring field of the Hall sensor has a magnetic flux density, which is greater than a magnetic flux density in the rearward adjustment position.

5. The sensor system according to claim 3, wherein the Hall sensor and the first and the second preloaded magnets are arranged relative to the upper rail that is moveable lengthwise in such a way that they are moveable jointly and together with the upper rail, and in a case of a running-over and detecting of the stationary lower rail, a magnetic field of the first preloaded magnet or a resulting magnetic field from the first and second preloaded magnets will be deformed in such a way that a bulk of the field lines of the magnetic field will be essentially directed past a measuring field of the Hall sensor and an output signal corresponding to a rearward adjustment position will be generated at the Hall sensor.

6. The sensor system according to claim 1, wherein the Hall sensor is a smaller distance from the stationary lower rail than the first preloaded magnet.

7. The sensor system according to claim 1, wherein the first preloaded magnet is at a vertical distance of 0.5 mm to 10 mm from the Hall sensor.

8. The sensor system according to claim 1, wherein the first preloaded magnet has a magnetization whose vector with an angle of 0° to 180° relative a measuring surface of a measuring field of the Hall sensor.

9. The sensor system according to claim 3, wherein the Hall sensor and/or the first preloaded magnet and/or the second preloaded magnet are arranged at a distance from the upper rail that can be moved lengthwise.

10. The sensor system according to claim 3, wherein the Hall sensor and the first preloaded magnet and the second preloaded magnet are arranged in a sensor housing.

11. The sensor system according to claim 3, wherein the Hall sensor and the first preloaded magnet and the second preloaded magnet or the sensor housing are connected to the adjustable upper rail.

12. The sensor system according to claim 1, wherein the upper rail that is moveable lengthwise in the forward adjustment position projects over a forward free end of the stationary lower rail.

13. The sensor system according to claim 12, configured such that during adjustment of the upper rail, a forward free end of the stationary lower rail will be monitored.

14. The sensor system according to claim 1, wherein relative to a mounting position of the stationary lower rail and the upper rail that is moveable lengthwise, the Hall sensor is encompassed in a mounted state by a longitudinal side of the upper rail that is moveable lengthwise and by a metal extension that projects laterally and upward essentially along an entire longitudinal extension of the longitudinal side of the upper rail that is moveable lengthwise, while the Hall sensor is covered from above by the first preloaded magnet that is arranged thereabove.

* * * * *